US008373580B2

(12) United States Patent
Bunch et al.

(10) Patent No.: US 8,373,580 B2
(45) Date of Patent: Feb. 12, 2013

(54) SYSTEMS AND METHODS FOR RAPID UPDATING OF EMBEDDED TEXT IN RADAR PICTURE DATA

(75) Inventors: Brian P. Bunch, Snohomish, WA (US); Rodney Rowen, Redmond, WA (US); Brennan Kilty, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 352 days.

(21) Appl. No.: 12/862,586

(22) Filed: Aug. 24, 2010

(65) Prior Publication Data

US 2012/0050073 A1    Mar. 1, 2012

(51) Int. Cl.
G01C 21/00 (2006.01)
G01C 23/00 (2006.01)
G08B 21/00 (2006.01)
G08G 1/123 (2006.01)
G01S 13/08 (2006.01)
G01S 13/00 (2006.01)
G06F 3/048 (2006.01)

(52) U.S. Cl. ........ 340/971; 340/945; 340/973; 340/980; 340/995; 342/142; 342/176; 715/834

(58) Field of Classification Search .................. None
See application file for complete search history.

(56) References Cited

U.S. PATENT DOCUMENTS

| 4,651,282 | A  | * | 3/1987  | Robinson et al. ........... 455/158.2 |
| 4,903,017 | A  | * | 2/1990  | Wooller ........................ 340/975 |
| 5,805,100 | A  | * | 9/1998  | Becker et al. ................ 342/26 B |
| 5,838,262 | A  | * | 11/1998 | Kershner et al. ............. 340/945 |
| 6,816,780 | B2 | * | 11/2004 | Naimer et al. ................ 701/467 |
| 6,836,239 | B2 | * | 12/2004 | Scott ............................. 342/176 |
| 7,161,531 | B1 | * | 1/2007  | Beazell ......................... 342/176 |
| 8,245,156 | B2 | * | 8/2012  | Mouilleseaux et al. ...... 715/834 |
| 2004/0183695 | A1 | * | 9/2004  | Ruokangas et al. .......... 340/945 |
| 2004/0227660 | A1 | * | 11/2004 | Scott ........................... 342/26 R |
| 2009/0009378 | A1 | * | 1/2009  | Ilan ................................ 342/13 |
| 2011/0202277 | A1 | * | 8/2011  | Haddad ............................ 702/7 |

* cited by examiner

*Primary Examiner* — George Bugg
*Assistant Examiner* — Renee Dorsey
(74) *Attorney, Agent, or Firm* — Lowe Graham Jones PLLC

(57) ABSTRACT

Systems and methods for efficiently updating text or symbol annunciations outputted by an avionics system on legacy displays. Instead of using a set sweeping pattern to update the display, a smart updating concept is used. The smart updating concept senses when the pilot is adjusting the selected altitude control (or other user interface device that will alter displayed annunciations), then gives priority to updating the radial lines on the display that contain the annunciation field. Once the annunciation field has been updated, the display returns to normal operation.

9 Claims, 7 Drawing Sheets

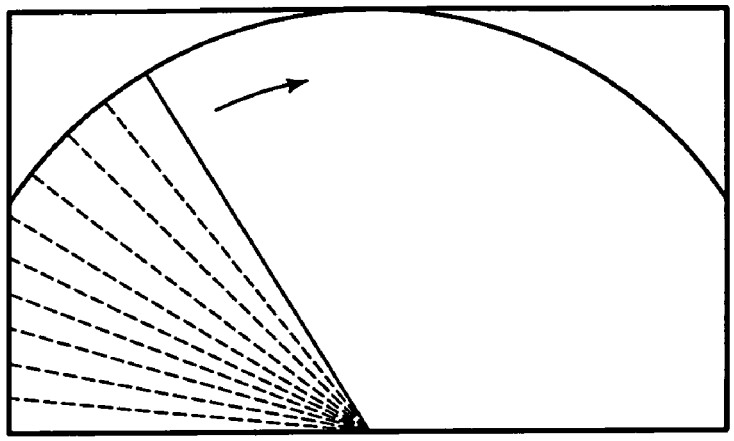
FIG. 1 *(PRIOR ART)*
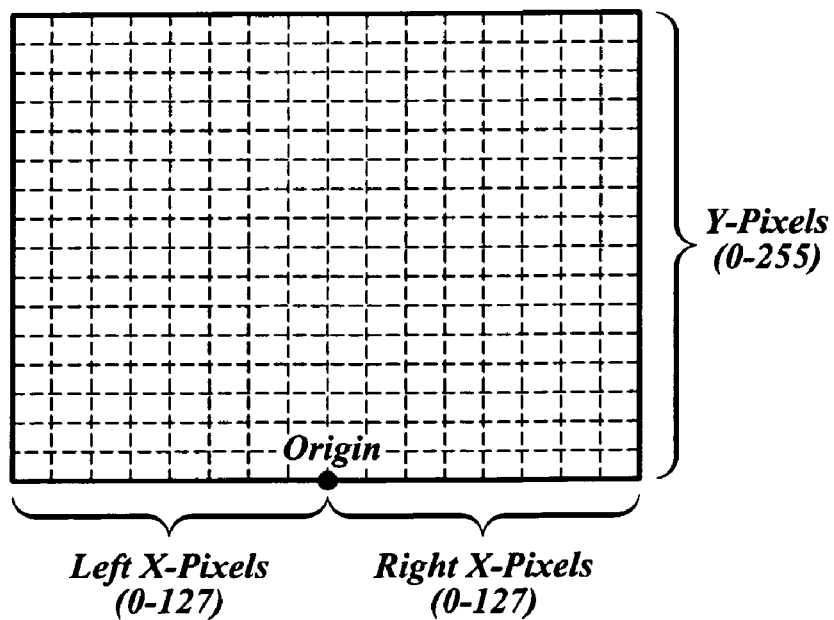
FIG. 2 *(PRIOR ART)*

FIG. 5 *(PRIOR ART)*

SYSTEMS AND METHODS FOR RAPID UPDATING OF EMBEDDED TEXT IN RADAR PICTURE DATA

BACKGROUND OF THE INVENTION

There are two industry standards used to communicate digital picture data from radars to displays: ARINC 453 and WXPD.

ARINC 453 is an industry standard mutually developed by radar and display manufacturers in the late 1970's. It was never released as an ARINC standard, but was adopted in the ARINC 708 standard.

The two standards have some similarities in the physical layer in that they both use Manchester II encoded bits at a 1 Mbps data rate, which is self-clocking and so only requires one twisted-shielded pair per display in the aircraft installation.

However, the formatting of the data between the two standards is different. ARINC 453 radials contain a 64-bit preamble including information such as radar mode, tilt, gain, BITE status and the angle of the radial at which the picture data should be drawn. The picture data then follows this 64 bit preamble in the form of 512 3-bit words corresponding to ranges from 0 to the indicated display range, this range being divided into 512 increments. For example, on the 320 nm display range, each 3-bit word corresponds to $320/512^{ths}$ nautical miles. The 3 bits in each word are encoded with color data, allowing for up to 8 colors, e.g. black, green, yellow and red (some manufacturers allow additional colors).

Hence, with ARINC-453, a 1600-bit packet (64 bits of preamble+512*3 color words) is sent from the radar to the display for every radial line desired to be drawn on the display, hence the picture is drawn in the manner of a "windshield wiper." See FIG. 1.

By contrast, the WXPD data was originally intended to only communicate picture data and does not include a preamble (the equivalent data is sent on a separate lower-speed RS-422 bus known as Serial Control Interface or SCI). It does however contain an 8 bit start sequence to sync clocks and a 3-bit invalid Manchester sequence to alert the start of a new radial. Additionally, instead of specifying a radial angle at which the display is to draw the radial, WXPD is arranged as several 5-bit words, typically 256 (more or less are possible) in which case there typically would be a total of 1280 bits of payload per radial transmission. Each 5-bit word contains two bits, referred to as Inc-X and Inc-Y, and three color bits (similar in that respect to ARINC 453). The Inc-X and Inc-Y bits are used to specify the direction relative to the previously affected display pixel in which the next pixel is to be drawn.

The display is assumed to be organized as a grid of 256× 256 pixels as shown FIG. 2. The coordinate of each pixel is given in terms of an X value and Y value. The Y-values range from 0 to 255, whereas the X values range from 0 to 127, but can be either right or left of the origin (corresponding to "positive" or "negative" values along the X-axis). The display maintains two values internal registers corresponding to the Y address and X address of the pixel to be displayed.

At the beginning of the radial packet is a sequence of 8-bits of Manchester II encoded zeros, which syncs up the display's clock with the data packet it is receiving. Then there is a 3-bit invalid Manchester II word sequence which causes the display to reset the two pixel position registers to X=0, Y=0, positioning the current pixel position at the bottom center of the WXPD display. The first 5-bit word contains status data for setup of the display, including determining which direction along the X-axis the X register represents. The second word is designated as reserved and is not used. The display assumes the color information for these two words to be black. The third 5-bit word begins the radial picture data. Upon receiving a 5-bit word, if the Inc-Y bit is set and the Inc-X bit is not, the display hardware increments the Y address counter, so that the resulting address of the pixel is [0,1], that is, 1 pixel in the Y direction and 0 pixels in the X direction. The display then writes the appropriate color at that pixel as determined by the remaining 3 bits in the 5-bit word.

Likewise, if the Inc-X bit is set and they Inc-Y bit is not, the display hardware increments the X address counter so that the resulting address of the pixel is [1,0], that is, 1 pixel in the X direction and 0 pixels in the Y direction. The display then writes the appropriate color at that pixel. The information as to whether the X address is to be interpreted as left or right is encoded in the first 5-bit word of the radial packet. Every Inc-X bit in a given WXPD radial is interpreted as an increment to either left or right as determined by that first status word.

If both Inc-X and Inc-Y are set, the display will actually increment the Y address (X=0 and Y=1), write the color and then increment the X-address (X=1 and Y=1) and write the same color, hence there are two writes in this case for the single 5-bit word.

Three examples are shown in FIG. 3. In this simplified example, the display is 16×16 instead of the normal 256× 256).

For Case A, only the Inc X bits are set (assumes first 5 bit word indicates X addresses to be interpreted as "right"). (Also note display hardware limits addresses as appropriate.) For Case B only the Y-bits are set and in Case C, the Inc-X, Inc-Y or both are set so as to result in radial at a given angle being drawn.

For Case C, where there are two adjacent pixels in a given row, the 5-bit word has both Inc-X and Inc-Y set and so internally the display increments the Y address, writes the color data then increments the X address and writes the same color data. This feature helps ensure no "holes" in the displayed data. It is sometimes referred to as the "fill algorithm."

In the intended use of WXPD, the radar would draw radial lines at angles corresponding to the current antenna angle. This obviates the need for the radar to store an entire 2D memory of data, that is, it can communicate the data it collected in real time in its native (polar) coordinates to the display.

It is possible however to draw other than straight lines (or at least their pixilated equivalents). Any shape of line that can be described with monotonically increasing values of the (magnitude of) X and Y addresses can be drawn, like 7's, L's or steps.

The EGPWS system has taken advantage of this fact in WXPD displays to draw a series of vertical lines that sweep from side to side. This is often called "curtain mode" and is illustrated in FIG. 4.

These vertical lines are realized by sending N 5-bit words with only Inc-X set, where N corresponds to the desired absolute offset from the X=0 coordinate of the vertical line. These are followed by 256 5-bit words with only Inc-Y set to "draw" a line from the bottom to the top of the display. These result in a series of "L's" (or backwards "L's") being written to the display, where the horizontal leg of the "L" is varied in length.

This method greatly simplifies the processing of data natively Cartesian for display by eliminating the trigonometry generally involved in converting the angle to a series of Inc-X and Inc-Y values. This is in fact is very important when text is embedded in the WXPD display data. The traditional radial method makes it very difficult to ensure a one-to-one correspondence between the source Cartesian data and the resulting displayed data due to quantization effects.

It has a second advantage of optimizing the update rate of the display since there is less redundant data sent. In the radial mode, generally 512 radials are required to cover the entire display (much of the data near the origin is written over by subsequent radials). In contrast, curtain mode can cover the entire display in 256 radials.

A typical "curtain mode" EGPWS display is shown in FIG. 5. The EGPWS display shown is in "peaks" mode where the top number (096) in the lower right hand corner represents the high terrain elevation displayed and the lower number (025) represents the altitude of the boundary between amber indications and black. These numbers are actually embedded in the WXPD picture data as bit-mapped images.

The RDR-4000 IntuVue™ radar, by Honeywell International Inc., incorporates new operating modes for which the appropriate annunciations are not supported by many legacy WXPD or ARINC 453 displays. Two specific examples are that the RDR-4000 has an Automatic Weather Mode and a Manual Weather Mode. Legacy WXPD displays do not provide a means to annunciate to the crew which of these two modes is selected. Further, there is a crew selectable parameter associated with the Manual Weather Mode, specifically, altitude, which sets the altitude "slice" to be displayed.

The text-embedded-in-picture data concept used by EGPWS can be used to solve these problems. However, while the crew is adjusting the altitude parameter, feedback in the form of a displayed value is updated only once every 3-4 seconds which is an inadequate delay from a human factors standpoint.

It is not possible to increase the update rate of the entire display due to an inherent limit of 240 radials per second (current implementations self impose a more practical limit of approximately 120 Hz because WXPD displays do not necessarily adhere exactly to the engineering specification for the display bus). Thus, the only solution is an expensive one and that is to replace the aircraft's cockpit with a new display system or update the embedded software in the legacy display—both of which are normally cost prohibitive.

SUMMARY OF THE INVENTION

The present invention provides systems and methods for efficiently updating text outputted by a weather radar system on legacy displays. Instead of using a set sweeping pattern to update the display, an intelligent updating concept is used. The intelligent updating concept senses when the pilot is adjusting the selected altitude control (or other user interface device that will alter displayed text), then gives priority to updating the radial lines on the display that contain the affected text information. Once the text has been updated, the display returns to normal operation.

BRIEF DESCRIPTION OF THE DRAWINGS

Preferred and alternative embodiments of the present invention are described in detail below with reference to the following drawings:

FIGS. 1-5 show radar display techniques according to the prior art;

DETAILED DESCRIPTION OF THE INVENTION

Figure 3:
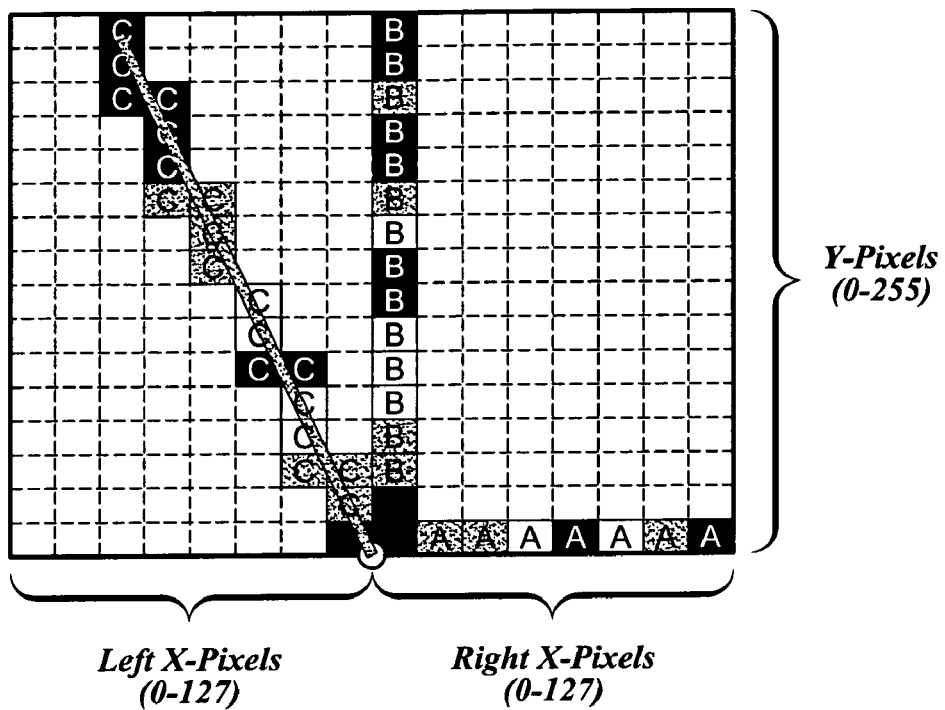
Figure 4:
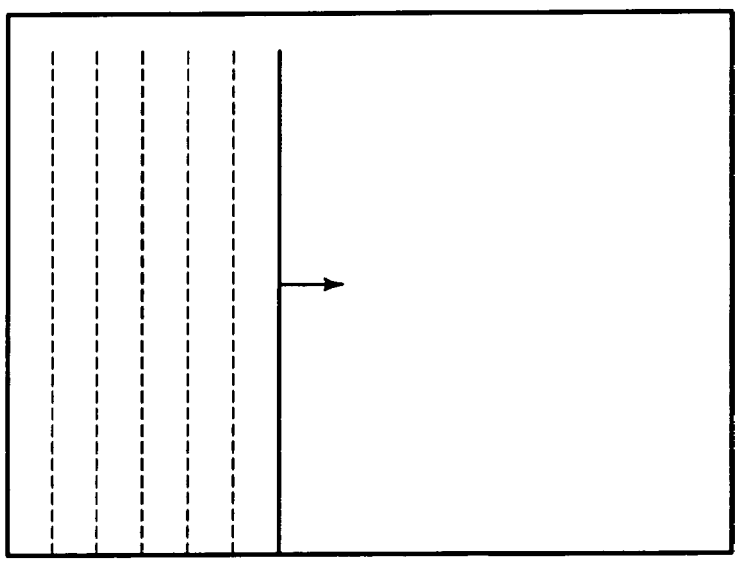
Figure 5:
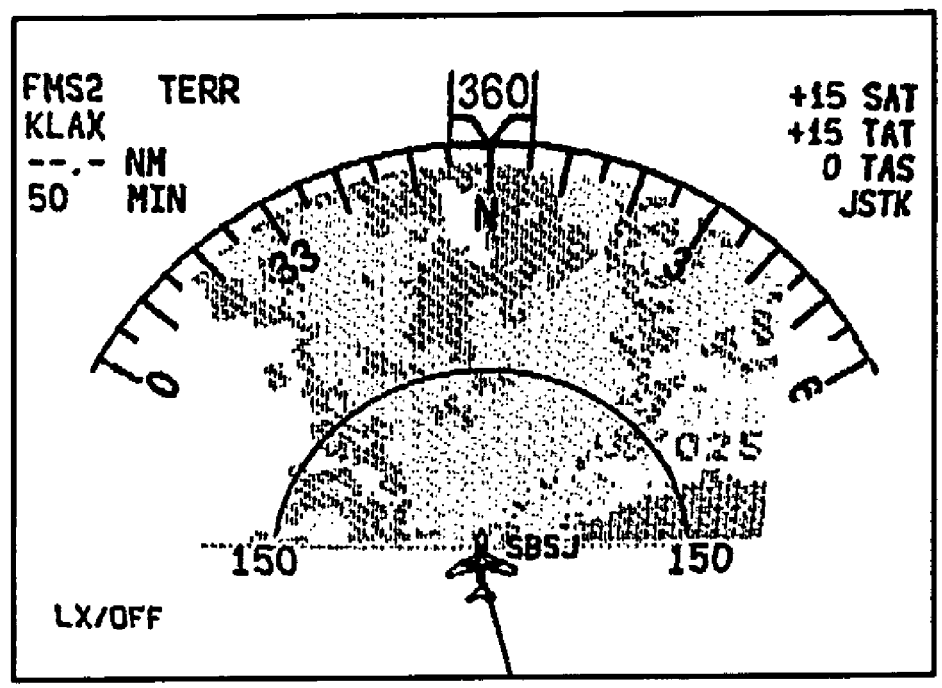
Figure 6:
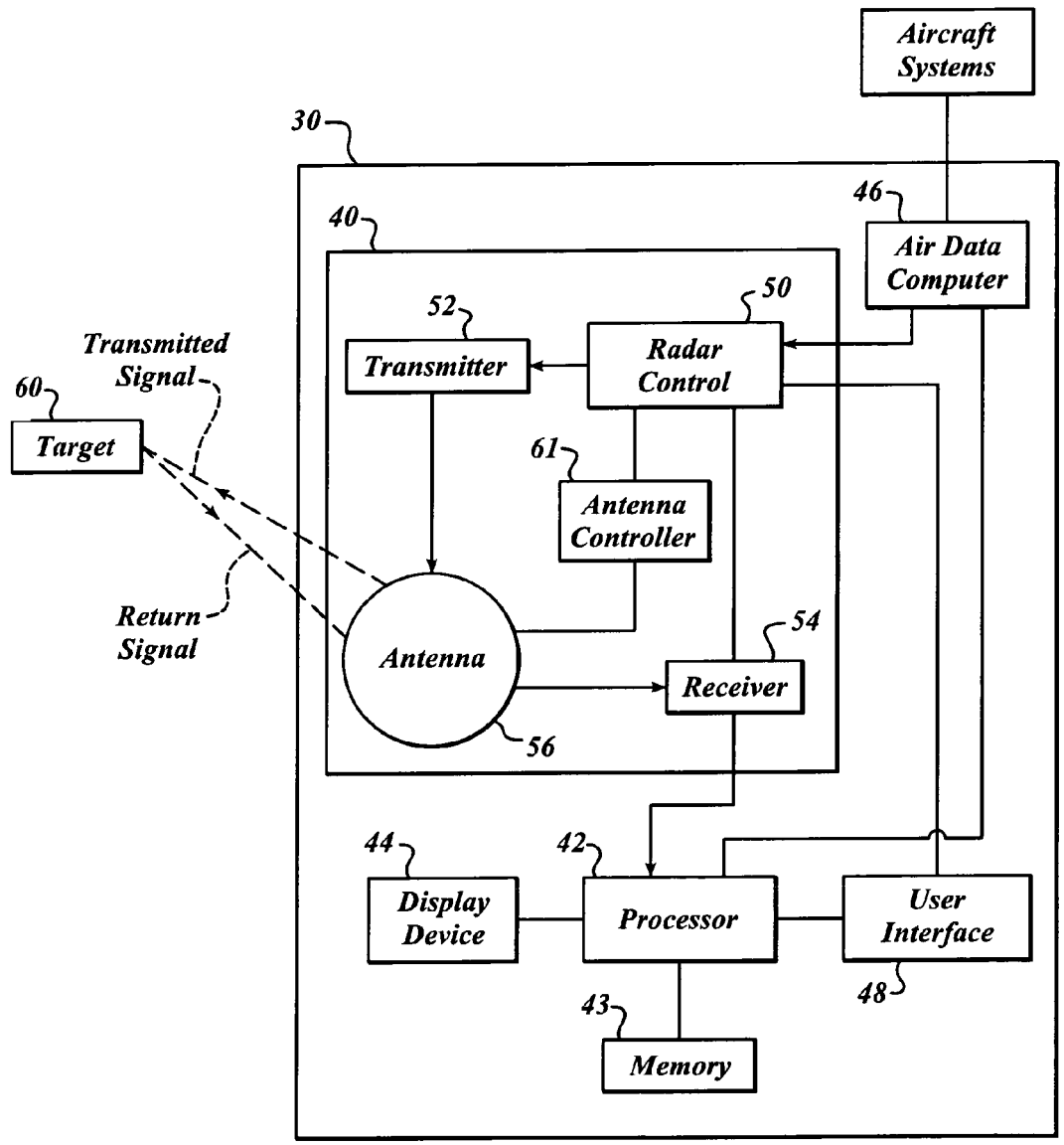
FIG. 6 illustrates an example radar system formed in accordance with an embodiment of the present invention.

FIG. 6 illustrates an example system 30 for presenting on a plan view weather radar display information that uniquely updates relevant text data displayed on a legacy display device 44 (e.g. see FIGS. 1-5). The system 30 also includes a weather radar system 40, a display processor 42, memory 43, an air data computer (ADC) 46, and a User Interface 48 coupled to the display processor 42. The display processor 42 is electrically coupled to the radar system 40, the display device 44, the ADC 46, and the memory 43. The radar system 40 includes a radar controller 50, a transmitter 52, a receiver 54, an antenna 56, and an antenna controller 61. The radar controller 50 controls the transmitter 52 and the receiver 54 for performing the transmitting and receiving of signals through the antenna 56 based on the selected radar mode and other pilot inputs received from the user interface 48, and aircraft data (i.e., altitude, speed, position, heading, roll, yaw, pitch, etc.) received from the ADC 46, a Flight Management System (FMS), Inertial Navigation System (INS), and/or Global Positioning System (GPS) (not shown). The ADC 46 generates air data based on signals received from various aircraft flight systems.

The radar system 40 transmits radar signals from the transmitter 52 and directed out the antenna 56 into space, in a direction determined by the antenna controller 61, and detects return signals with the receiver 54 if a target 60 is present to scatter energy back to the receiver. Preferably, the radar system 40 digitizes the return signals and sends the digitized signals to the display processor 42. The display processor 42 translates the received return signals for storage in a multi-dimensional buffer in the memory 43. The display processor 42 then generates a two-dimensional image for presentation on the display device 44 based on any control signals sent from the User Interface 48 or based on signals from the radar system 40 (such as predictive wind-shear alerts).

The display processor 42 generally communicates this two-dimensional image to the display device 44 using radial packets—each representing a one-dimensional subset of the two-dimensional image. The display processor 42 normally communicates these radials in a fashion such that the two-dimensional image is refreshed in a wind-shield wiper or a left to right (or right to left or both) curtain like motion. However, in communications between the display processor 42 and the User Interface 48, new annunciation values are received by the display processor 42. Periodically the display processor 42 compares the new desired annunciation values with annunciation values most recently communicated to the display device 44 (stored in memory 43). If the display processor 42 determines an update of text annunciations on the display device 44 is necessary, it interrupts the conventional sweep pattern of radials sent to the display device 44 and sends radial data to update portions of the display device 44 reserved for text (or symbol) annunciations related to the User Interface control being adjusted—referred in FIG. 10 as an Annunciation Box. The display processor 42 then reverts to send the radial data in the conventional sweep pattern until a user interface signal changes which warrants a text annunciation change.

Figure 7:
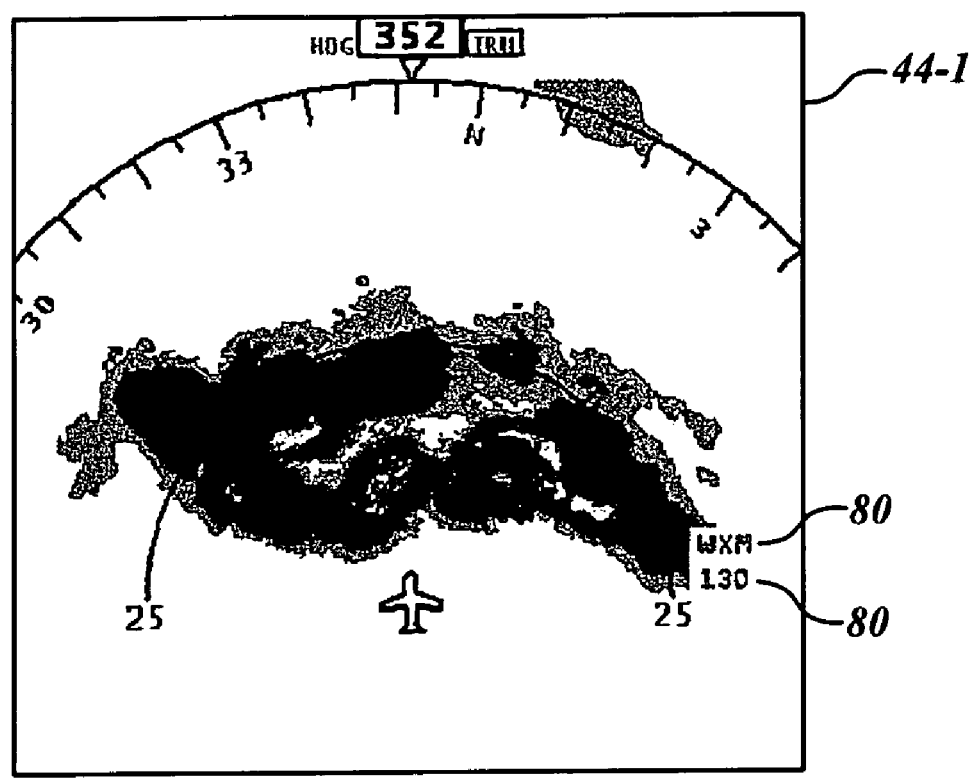
FIG. 7 is a screen shot of a weather display with text that operates in accordance with an embodiment of the present invention.

For example, text updating occurs when it is sensed that the pilot is adjusting the altitude of the desired 2-D slice of radar returns to be displayed. The weather radar system 40 gives priority to updating vertical line radials contained in an Annunciation Box 80 on the right side of a display 44-1 containing the text information, see FIG. 7.

It should be appreciated that the annunciation does not have to be text, but could also include graphics, icons, or symbols.

In one embodiment, the weather radar system 40, the display processor 42, and the User Interface 48 is a RDR-4000 IntuVue™ radar, by Honeywell International Inc., and the display device 44 is a WXPD or ARINC-453 (ARINC-708) display.

Figure 8:
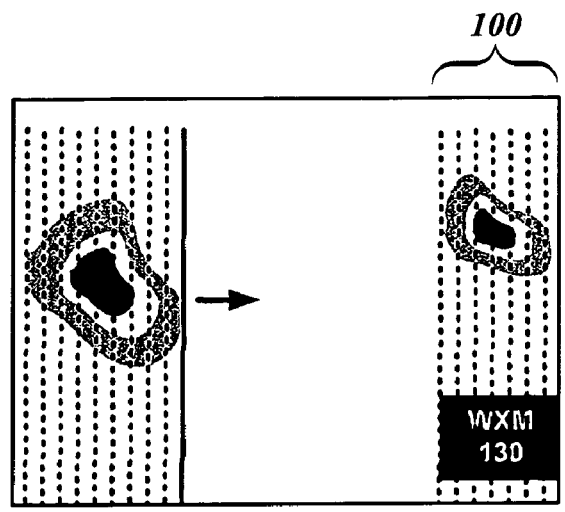
FIG. 8, illustrates a WXPD display updated in accordance with the present invention.

In one embodiment, for a WXPD display the number of vertical lines 100 required to draw the text field shown in the lower right hand corner of FIG. 8 is 24. According to the prior art the picture data is normally drawn at the max rate of approximately 120 radials per second. This means that the entire picture will be updated once every 2.1 seconds.

In accordance with the present invention, the display processor 42 checks annunciation values received from the user interface 48 with values stored in memory 43 every 0.333 seconds. If an annunciation change is required, all radials communicated to the display device 44 will pertain to the region of the display containing the annunciation text until the annunciation has been updated, at which time the annunciation values stored in memory 43 are also updated. In example, if the pilot adjusts the selected altitude value using the User Interface 48, the display processor 42 updates the text field at a rate of 3 times per second or once per 0.333 seconds—if necessary. The altitude annunciation in this particular case consists of 24 vertical line radials, and at a radial rate of 120 Hz, 24 radials are outputted in 0.2 seconds. During the remaining 0.133 seconds (16 radials at 120 Hz) prior to the next annunciation change check, the display processor 42 sends radials pertaining to the rest of the displayed image as normal. At the expiration of the 0.333 second timer, the display processor 42 checks values received from the user interface 48 for further changes to the selected altitude value. If the value is different from the currently annunciated value, the 24 radials containing the selected altitude text are again given priority in the display processor 42 and communicated to the display 44 over the next 0.2 seconds. However, if there has been no additional change to the selected altitude value from what was previously communicated to the display 44, then the radials are updated as normal over the next 0.333 seconds (40 radials) until the values received from the User Interface 48 are again checked. If the pilot is continuously adjusting the selected altitude on the user interface, the display processor 42 devotes 72 radials per second to the updating of vertical lines 100 (FIG. 8) containing the text data. This leaves 120−72=48 radials per second that are devoted to the remaining 256−24=232 vertical lines to update the remainder of the display. This results in an annunciation update of up to 3 times a second and a worst case update rate for the entire display of 4.8 seconds.

While 4.8 seconds is significantly longer than the "normal" 2.1 seconds, it is a perfectly acceptable value from a human factors perspective. In fact, many legacy radar displays (44) can have update rates as slow as once per 10 seconds. The values provided are only illustrative. The relationship between text update rate and entire picture update rate can be traded off to achieve the most acceptable human factors design.

In another embodiment, the display processor 42 only updates the character in the text field that is changing (rare that all 3 will change at one time).

Figure 9:
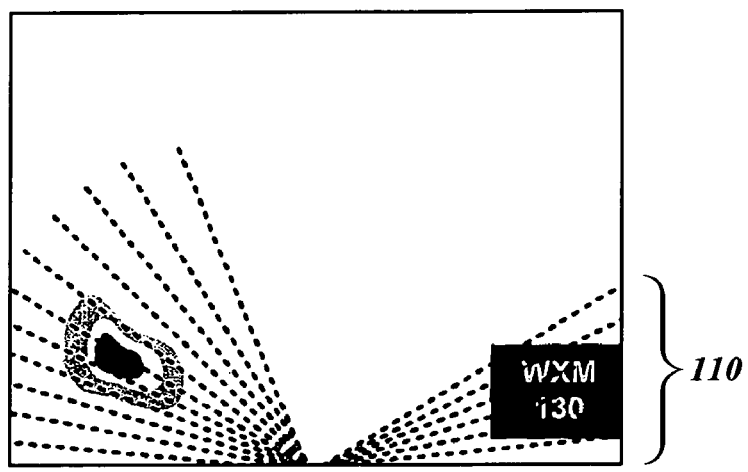
FIG. 9, illustrates an "ARINC 453" display updated in accordance with the present invention.

A similar concept can be applied to ARINC 453 displays. As shown in FIG. 9, the display processor 42 gives updating priority to radials 110 which contain the text.

In another embodiment, conditional interleaving of radials pertaining to the selected altitude annunciation is utilized rather than a timer. For example, for every 40 radials sent by the display processor 42 to the display 44, the display processor 42 polls the user interface 48 and checks memory 43 for changes to the selected altitude value. If a change has been made, 24 of the 40 radials sent will pertain to the portion of the display (or Annunciation Box) containing selected altitude and the remaining 16 radials sent will pertain to the remainder of the display. If no change to the selected altitude is detected, all 40 of the radials sent to the display 44 will follow the normal radial update pattern.

In another embodiment, simple interleaving of radials pertaining to the selected altitude annunciation with radials pertaining to the remainder of the display 44 are sent by the display processor 42 whether a user interface 48 value change has occurred or not. In this embodiment, 24 of every 40 radials transmitted—from the display processor 42 to the display 44—pertain to the region of the display containing the selected altitude text. This interleaving method results in the worst case display refresh rate referred to above of once every 4.8 seconds, but the selected altitude annunciation will be refreshed at a rate of 3 time per second.

Figure 10:
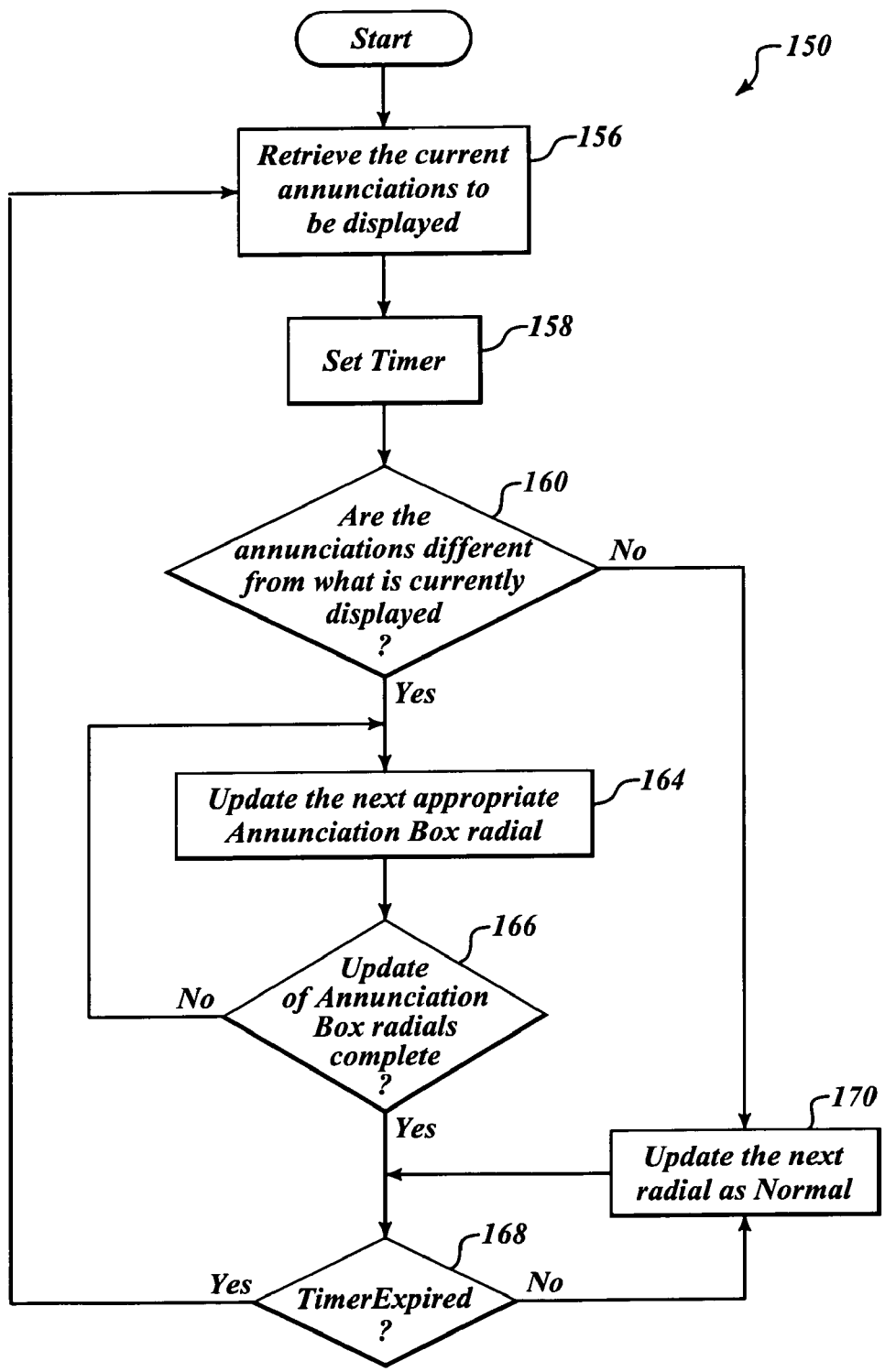
FIG. 10 is a flowchart of an exemplary process performed by the system shown in FIG. 6.

FIG. 10 illustrates a flow chart of an example process 150 performed by the system 30 shown in FIG. 6. After the system 30 is started and initialized, the display processor 42 retrieves the current annunciations that are to be displayed on the display device 44 by communicating with the User Interface 48, see block 156. Next at a block 158, a timer in the display processor 42 is set to a desired update period and the timer begins counting down. Next at a decision block 160, the display processor 42 checks memory 43 and determines if the new annunciations are different from what is currently being displayed. If the new annunciations are no different from what is currently displayed, then the display processor 42 updates the radials as normal on the display device 44, see block 170 and decision block 168, until the timer expires and the process returns to block 156. If at the decision block 160 the new annunciations are different from what is currently being displayed, then at block 164 the radar display processor 42 sends a radial update for a portion of the displayed image that includes the changing annunciation box. At a decision block 166, the display processor 42 determines if the update of the annunciation box has been completed. If the update of the annunciation box has not been completed, the process 150 returns to the block 164 and the next appropriate annunciation box radial is sent. If the update of the annunciation box radials has been completed, as determined at the decision block 166, the display processor 42 determines if the time initiated at the block 158 has expired at a decision block 168. If the time has expired, then the process 150 returns to block 156. If the time limit has not expired, then the process 150 proceeds to the block 170 to update the next display radial as normal. After updating the next radial as normal, as performed at the block 170, the process 150 returns to the decision block 168 regarding expiration of the time limit. If the timer at decision block 168 has not expired, the process 150 returns to the block 170 and the next display radial is updated as normal; however, if the timer at decision block 168 has expired the process 150 returns to block 156 and the new annunciations are retrieved.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method comprising:
   a) outputting display radials from an avionics system for display on at least one of a WXPD or ARINC-453 type display according to a continuous radial display pattern;
   b) identifying text produced by the avionics system for display;
   c) receiving a user interface signal from a user interface device associated with the avionics system, wherein the user interface signal is associated with text to be displayed on the display; and
   d) if the text associated with the user interface signal is different than the identified text, then interrupting the continuous radial display pattern and updating display radials associated with the text.

2. The method of claim 1, further comprising:
   beginning a timer proximate to execution of b);
   e) returning to a) after the display radials associated with the text have completed updating and at least one of a predetermined amount of time has not expired or predefined number of radials has not been exceeded.

3. The method of claim 2, further comprising:
   after e) returning to b) after the timer exceeds the predefined threshold time.

4. The method of claim 1, wherein weather radar system comprises an RDR-4000 weather radar system.

5. A system comprising:
   an avionics system configured to output at least one of graphic or text data;
   at least one of a WXPD or ARINC-453 type display configured to outputting the data received from the avionics system according to a continuous radial display pattern; and
   a user interface device in signal communication with at least one of the avionics system or the display,
   wherein the avionics system is further configured to:
   a) identify text produced by the avionics system for display;
   b) receive a user interface signal from the user interface device, the user interface signal is associated with text to be displayed on the display;
   c) compares the text associated with the user interface signal with the identified text; and
   d) interrupts the continuous radial display pattern and updates of display radials associated with the text, if the text associated with the user interface signal is different than the identified text.

6. The method of claim 5, wherein the avionics system begins a timer proximate to execution of a) and returns to outputting the radar data according to the continuous radial display pattern after the display radials associated with the text have completed updating and the timer has not expired.

7. The method of claim 6, wherein the weather radar system returns to a) after the timer exceeds the predefined threshold time and the display radials associated with the text have completed updating.

8. The method of claim 5, wherein the avionics system comprises an RDR-4000 weather radar system.

9. The method of claim 5, wherein the avionics system returns to outputting the radar data according to the continuous radial display pattern after the display radials associated with the text have completed updating and a predefined number of radials has not been exceeded.

* * * * *